United States Patent Office.

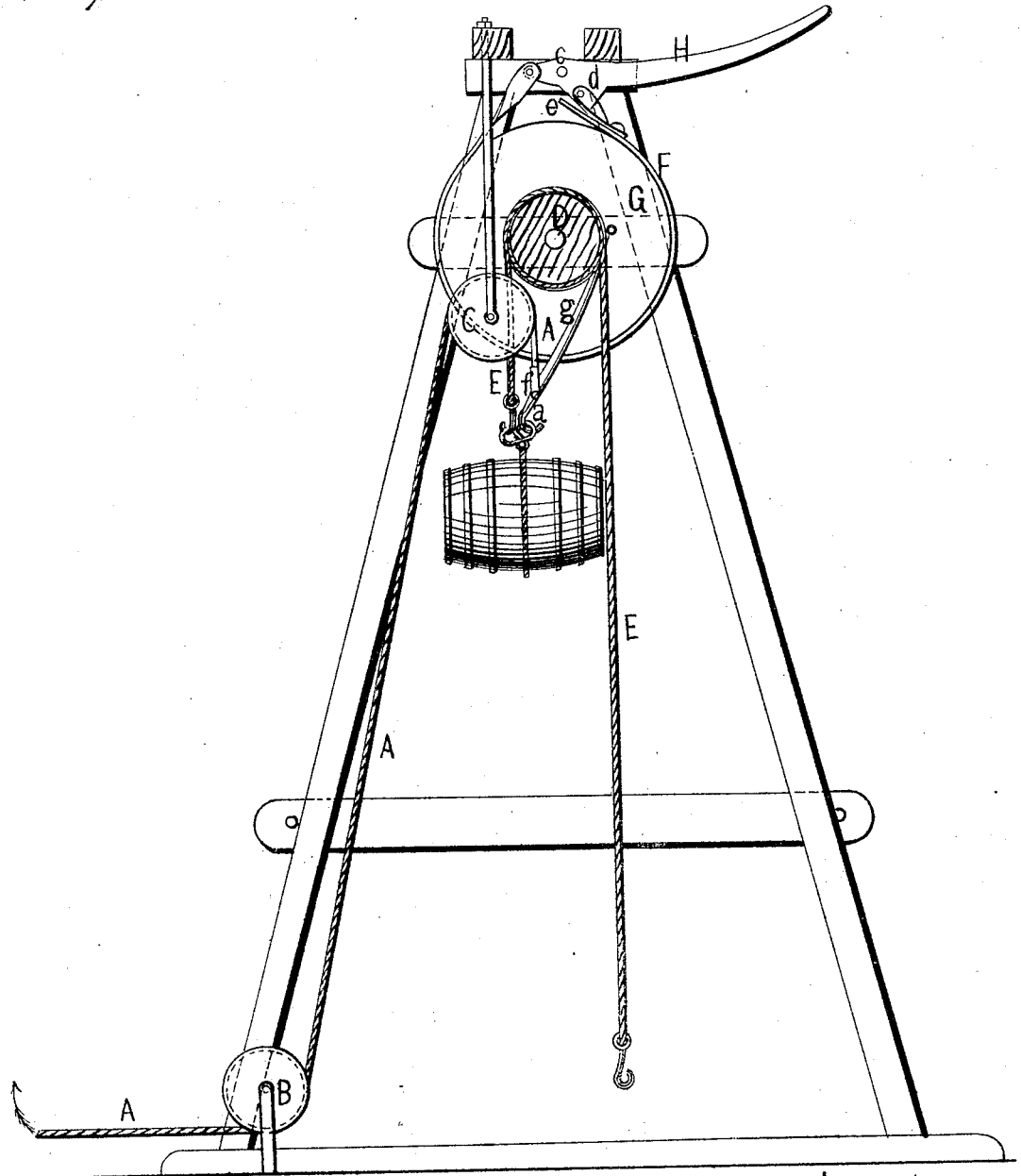

IMPROVEMENT IN HOISTING APPARATUS.

WILLIAM S. WATSON, OF NEW YORK.

Letters Patent No. 59,880, dated November 20, 1866.

SPECIFICATION.

TO ALL WHOM IT MAY CONCERN:

Be it known that I, WILLIAM S. WATSON, of the city, county, and State of New York, have invented a new and improved Hoisting Apparatus; and I do hereby declare that the following is a full, clear, and exact description thereof, which will enable others skilled in the art to make and use the same, reference being had to the accompanying drawing, forming part of this specification.

The drawing represents a sectional side elevation of this invention.

The object of this invention is to facilitate the operation of loading and unloading vessels, or of similar operations, in which a horse is used to raise and lower heavy weights; and it consists in combining with the ordinary hoisting tackle a windlass, in such a manner that the goods raised by the horse can be readily attached to the windlass and lowered by the same, and thereby the horse is relieved from all strain in backing up.

A represents the rope to which the horse is hitched in raising the goods from the hold of a vessel or from the dock. This rope runs under a pulley, B, secured in a swivel-fork in the ground, and over a sheave, C, which may be attached to the ship's tackle, or to any other convenient spot. A suitable hook, $a$, at the end of the rope, serves to secure the goods; and ordinarily the horse, in going ahead, has to raise said goods to the desired height, and in backing up he has to lower them, so that he is subjected to a heavy strain both in going ahead and in backing. In order to relieve the horse from all strain while backing, I combine with the hoisting tackle a windlass, D, on which is wound a rope, E, both ends of which are provided with hooks, $b$, and the length of which is such that, if one of the hooks $b$ is up, the other extends clear down to the hold of the vessel, or to the depth to which the goods have to be lowered. The windlass is provided with a friction strap, F, which extends around the sheave G, and the ends of which are both hinged to the hand-lever H. This lever has its fulcrum on a pivot, $c$, and it is provided with a nose, $d$, which bears on a spring, $e$, extending from one end of the strap F, so that, by the action of this spring, the lever is raised and the strap is opened. This object is effected by connecting the ends of said strap to the lever on opposite sides of its fulcrum, so that, when the lever is turned up, both ends of the strap are forced away from the sheave, and vice versa. By the combined action of the spring $e$ and lever H, the brake is rendered self-relieving, and by a slight depression of the hand-lever the brake is applied and the windlass stopped. The hook, $a$, of the hoisting rope is connected to said rope by a pivot, $f$, and an arm, $g$, extends from the same beyond the pivot to such a distance that, when the hook is left to itself, the arm $g$ turns down and the hook is turned up.

The operation of my apparatus is as follows:

I raise the goods by the strain of the horse on the rope A, in the usual manner; and as long as the goods are suspended from the hook $a$, the arm $g$ is turned up. When the goods have reached the desired height, I attach them to one of the hooks of the windlass-rope E, and by applying the brake to the windlass and slightly backing the horse the strain of the goods is thrown on the windlass-rope, and the hook $a$ is relieved. As soon as this takes place the arm $g$ turns down and throws said hook out of the ring of the tie-rope, and the goods can be lowered simply by relieving the brake of the windlass, allowing the horse to back free of all strain. In lowering one load by the windlass, the windlass-rope changes and the hook at its opposite end rises ready for the next succeeding operation. By these means the operation of lowering the goods can be performed in a very short time, and the horse being allowed to back free of all strain, can make quicker time, so that a saving in time and in horse-flesh is effected. In lowering the goods, it is essential to have my friction-strap, which controls the motion of the windlass to perfection, so that the goods can be lowered quick or slow, as may be desired.

What I claim as new, and desire to secure by Letters Patent, is—

1. I claim the combination of the rope A, and hoisting tackle B C, with the hook $a$, and its arm $g$, windlass D, rope E, and hooks $b$, all arranged in the manner described, and employed to permit the weight or thing lifted to be transferred from the rope and tackle to the windlass, substantially as and for the purpose specified.

2. In combination with the above, I claim the spring-brake F, lever H, and nose $d$, arranged and operating in the manner and for the purpose specified.

WM. S. WATSON.

Witnesses:
WM. F. MCNAMARA,
ALEX. F. ROBERTS.